(12) United States Patent
Hayashi

(10) Patent No.: US 7,080,852 B2
(45) Date of Patent: Jul. 25, 2006

(54) AIRBAG APPARATUS AND COVER

(75) Inventor: Shinji Hayashi, Shiga (JP)

(73) Assignee: Takata Corporation, Tokyo (JP)

( * ) Notice: Subject to any disclaimer, the term of this patent is extended or adjusted under 35 U.S.C. 154(b) by 293 days.

(21) Appl. No.: 10/642,660

(22) Filed: Aug. 19, 2003

(65) Prior Publication Data

US 2004/0046368 A1    Mar. 11, 2004

(30) Foreign Application Priority Data

Sep. 9, 2002    (JP)    ............................. 2002-262960

(51) Int. Cl.
  *B60R 21/20*    (2006.01)
(52) U.S. Cl. .................................. 280/728.3; 280/732
(58) Field of Classification Search ............. 280/728.3, 280/732
  See application file for complete search history.

(56) References Cited

U.S. PATENT DOCUMENTS

| | | | |
|---|---|---|---|
| 5,779,262 A * | 7/1998 | Totani et al. ............. | 280/728.3 |
| 6,565,115 B1 * | 5/2003 | Streck ...................... | 280/728.3 |
| 6,601,870 B1 * | 8/2003 | Suzuki et al. ............. | 280/728.3 |
| 6,623,030 B1 * | 9/2003 | Kurimoto .................. | 280/728.3 |
| 6,672,611 B1 * | 1/2004 | Preisler et al. ........... | 280/728.3 |
| 6,688,643 B1 * | 2/2004 | Schneider .................... | 280/753 |
| 6,716,519 B1 * | 4/2004 | Ueno et al. ............... | 428/308.4 |
| 6,726,239 B1 * | 4/2004 | Teranishi et al. ........ | 280/728.3 |
| 6,742,804 B1 * | 6/2004 | Suzuki et al. ............. | 280/728.3 |
| 2003/0067145 A1 * | 4/2003 | Yasuda et al. ........... | 280/728.3 |

FOREIGN PATENT DOCUMENTS

JP    2002-12116 A    1/2002

* cited by examiner

*Primary Examiner*—Paul N. Dickson
*Assistant Examiner*—Drew J. Brown
(74) *Attorney, Agent, or Firm*—Foley & Lardner LLP

(57) ABSTRACT

A cover for an airbag container includes a main cover body overlying a back plate and connectors. The connectors are configured to extend away from the main cover body to be connected to the container. The main cover body and the back plate include weakened regions configured to separate to permit an airbag to deploy into a vehicle cabin. The back plate, main cover body and connectors are separate non-integral elements of the cover.

9 Claims, 5 Drawing Sheets

AIRBAG APPARATUS AND COVER

BACKGROUND

The present invention relates to airbag apparatuses used in high-speed moving objects such as vehicles or the like and covers of the airbag apparatuses, and particularly relates to an airbag apparatus suitable for use as an airbag apparatus for a passenger seat and a cover of the airbag apparatus. More specifically, the present invention relates to a cover having a main cover body and a back plate, and to an airbag apparatus including the cover.

A typical airbag apparatus for a passenger seat is placed in front of the passenger seat and includes a container which is open at the front side, an airbag stored in the container, a gas generator for inflating the airbag, and a cover which covers the front side of the container. When the gas generator is activated and ejects gas, the airbag inflates and pushes the cover. Accordingly, the cover opens and the airbag expands into the vehicle cabin.

Japanese Unexamined Patent Application Publication No. 2002-12116 (incorporated by reference herein) discloses a cover including an instrument panel composed of a synthetic resin which corresponds to a main cover body and an airbag bracket composed of a synthetic resin which corresponds to a component which serves both as a back plate and connectors. The airbag bracket is fixed on the back surface of the instrument panel by vibration welding, and is connected to an airbag housing which corresponds to the container.

According to the Japanese Unexamined Pat. application Publication No. 2002-12116, although the instrument panel and the bag bracket can be composed of different materials, the component which serves both as the back plate and the connectors is integrally formed of a single synthetic resin.

SUMMARY OF THE INVENTION

An object of the present invention is to provide an airbag apparatus in which a cover, a back plate and connectors may be composed of different materials.

A cover of an airbag apparatus according to an exemplary embodiment of the present invention includes a main cover body having a door portion which opens when an airbag inflates and a back plate which is connected to the back surface of the main cover body, and connectors for connecting the cover to a container of the airbag apparatus which are provided separately from the back plate.

An airbag apparatus according to an alternative embodiment of the present invention further includes a container which is open at the front side, an airbag stored in the container, a gas generator for inflating the airbag, and a cover according to the present invention which covers the front side of the container.

In the cover for the airbag apparatus according to an embodiment of the present invention, the back plate is continuous to the main cover body and the connectors are provided separately from the back plate. Therefore, the back plate and the connectors may be composed of different materials, and the back plate, which is largely bent when the airbag inflates, may be composed of a suitable material. Accordingly, the expansion performance of the airbag apparatus increases.

In the above-described cover, each of the connectors preferably include a front piece placed on the back plate and a leg piece which projects rearward from the front piece behind the main cover body and which is connected to the container. In addition, preferably, the main cover body is provided with projecting pieces which project rearward from the back surface of the main cover body, and the projecting pieces are inserted through openings formed in the front pieces of the connectors and openings formed in the back plate. As a result, the connecting strength between the main cover body and the connectors can be increased. In this case, each of the front pieces of the connectors may be provided with a pair of upright pieces which project from the edges of the opening formed in the front piece, and the upright pieces of each of the front pieces may be connected to one of the projecting pieces while the upright pieces and the projecting piece are placed on each other. Accordingly, the connecting strength between the connectors and the main cover body can be further increased.

According to another embodiment of the present invention, a central portion of the back plate may be fixed to the door portion of the main cover body and edge portions of the back plate are formed continuously to the central portion such that the edge portions can be bent. In addition, the edge portions may be provided with the openings and the projecting pieces are inserted through the openings by placing the edge portions on the back surface of the main cover body. As a result, the projecting pieces can easily project rearward from the back plate. In addition, when the door portion of the main cover body opens, tensile stress applied to step portions of the back plate can be received by the projecting pieces.

According to various embodiments of the present invention the main cover body may be a lid or an instrument panel.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
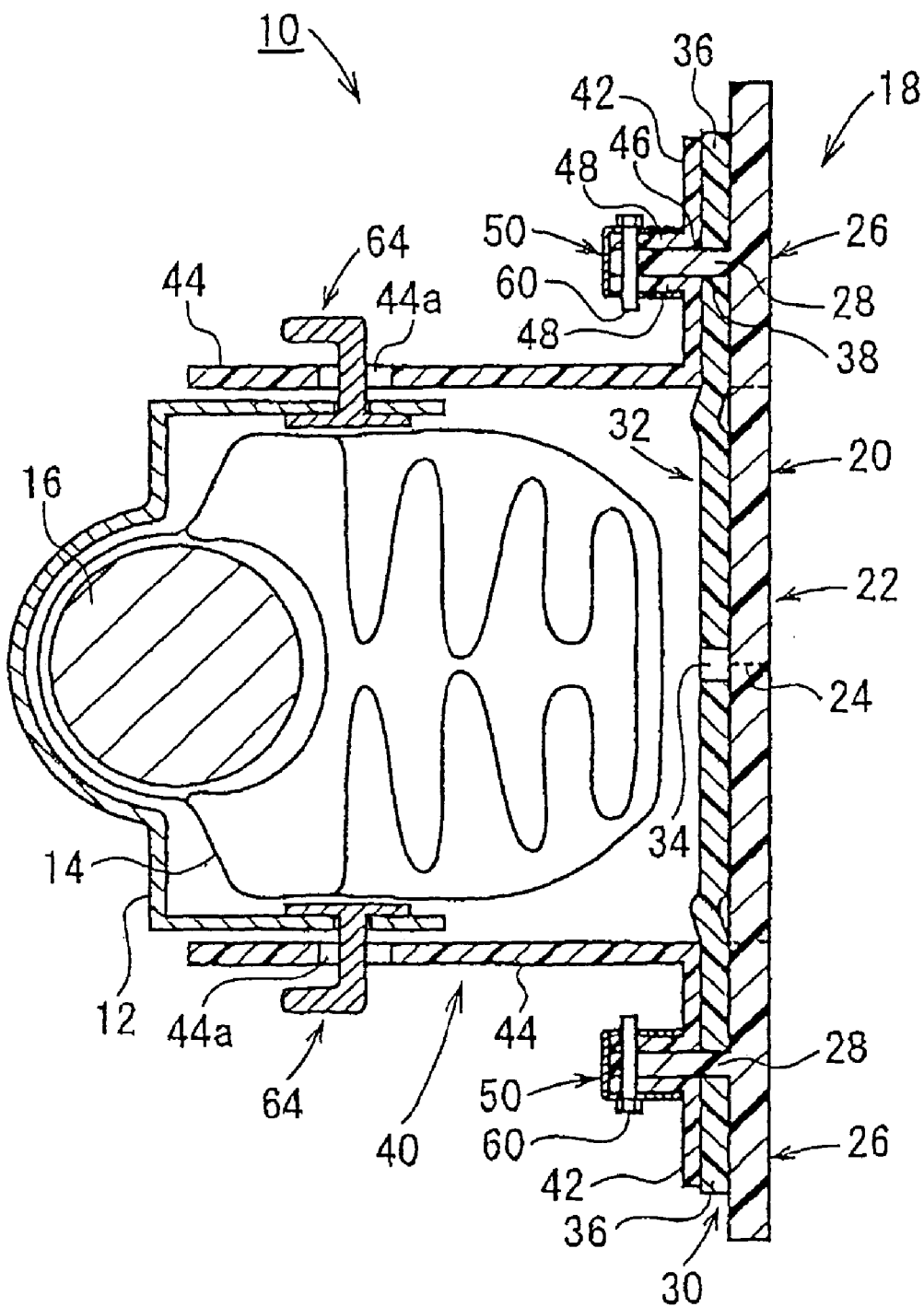
FIG. 1 is a sectional view of an airbag apparatus for a passenger seat according to an embodiment.
Figure 2:
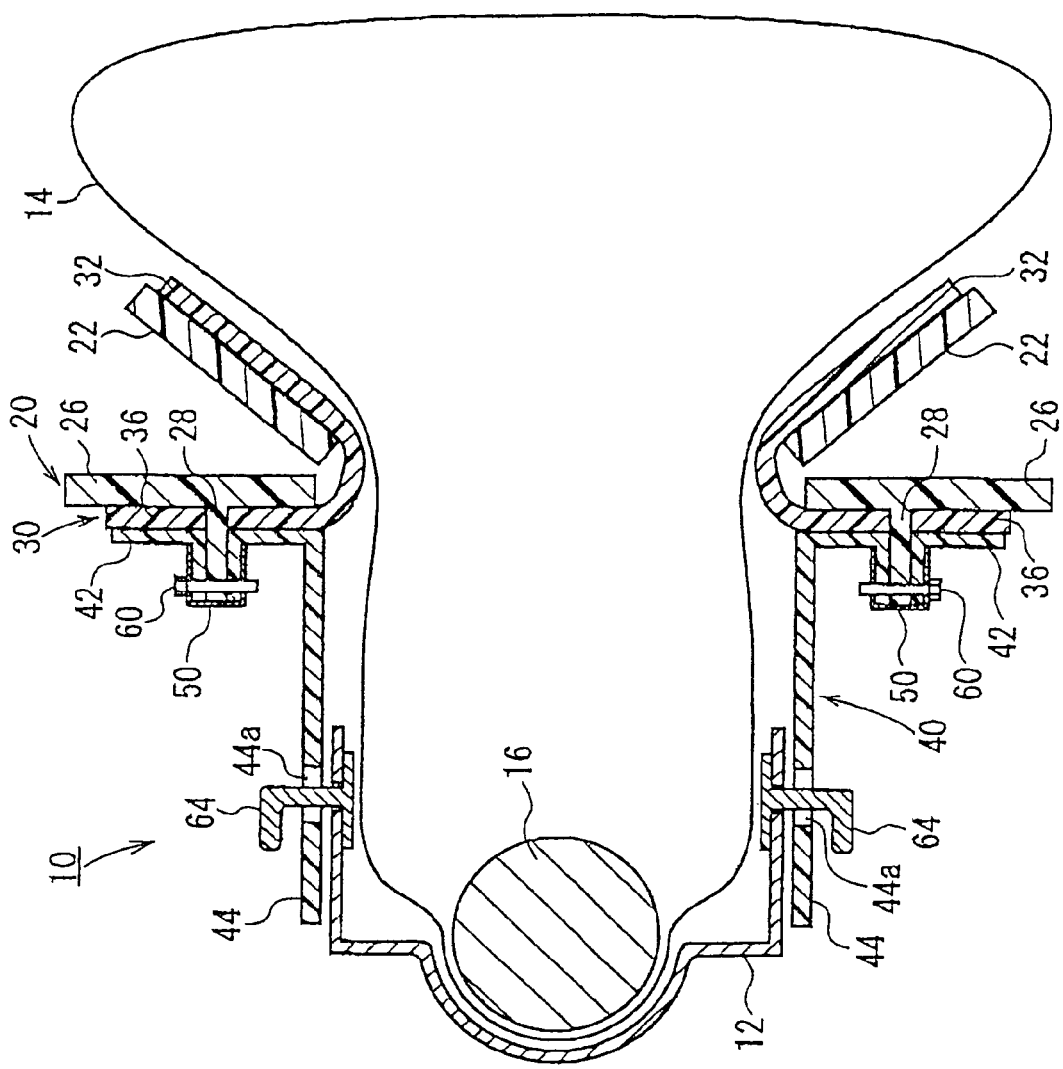
FIG. 2 is a sectional view of the airbag apparatus shown in FIG. 1 in a state in which the airbag is inflated.
Figure 3:
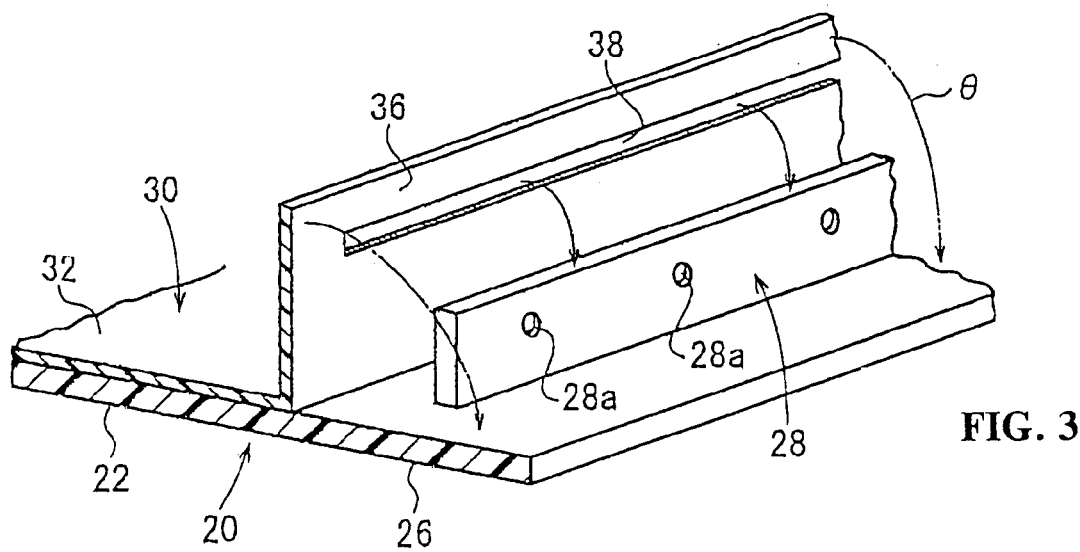
FIG. 3 is a perspective view of a main cover body and a back plate.
Figure 4:
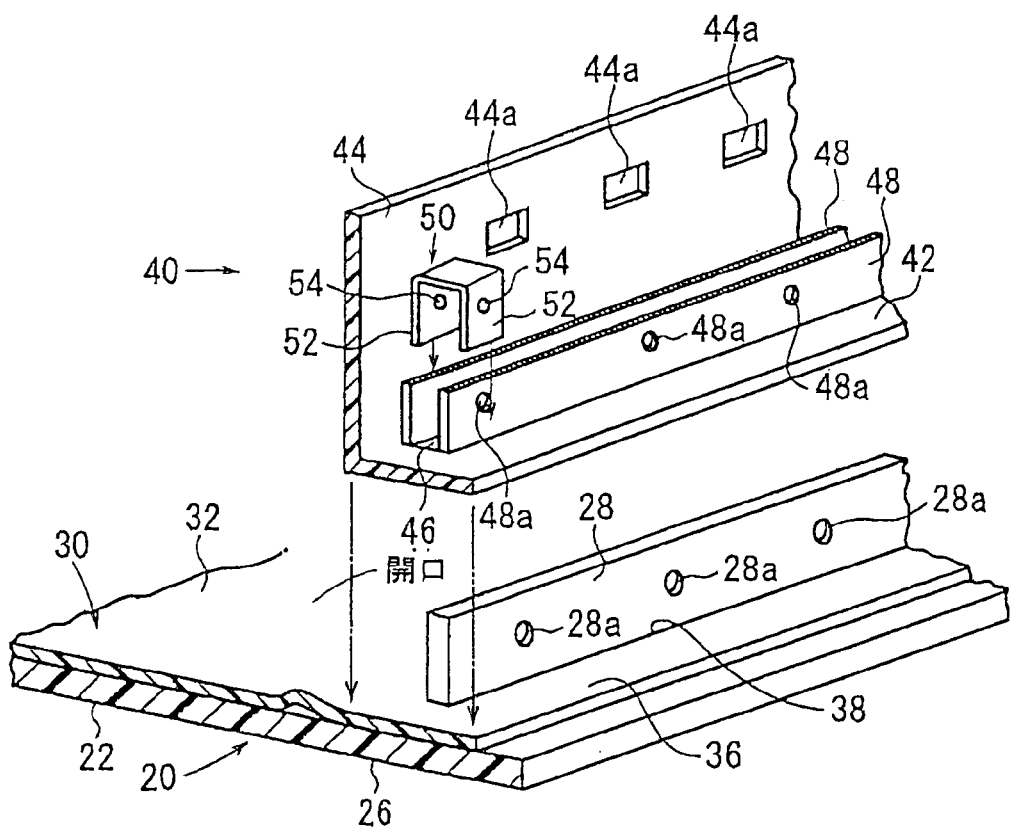
FIG. 4 is an exploded perspective view of a cover.

An embodiment of the present invention will be described below with reference to the accompanying drawings. FIG. 1 is a sectional view of an airbag apparatus for a passenger seat according to the embodiment, FIG. 2 is a sectional view of the airbag apparatus shown in FIG. 1 in a state in which an airbag is inflated, FIG. 3 is a perspective view of a main cover body and a back plate, FIG. 4 is an exploded perspective view of a cover, and FIGS. 5(a), (b), (c), and (d) are assembly diagrams of the cover.

The airbag apparatus 10 includes a container 12 which is open at the front side, an airbag 14 which is stored in the container 12 in a folded state, a gas generator 16 for inflating the airbag 14, and a cover 18 which covers the front side of the container 12.

The cover 18 includes a main cover body 20 positioned at the front, a back plate 30 provided on the back surface of the main cover body 20, and connectors 40 provided behind the back plate 30.

The main cover body 20 has a door portion 22 which faces the container 12 at the central region of the main cover body 20. The door portion 22 is provided with a tear line 24 which is a concavity, such as a groove or the like, used for breaking the door portion 22.

In addition, the main cover body 20 has flange portions 26 at the peripheral regions of the main cover body 20 which protrude beyond the sides of the container 12 at an area in front of the container 12. The flange portions 26 are provided with projecting pieces 28 which projects substantially perpendicularly from the back surfaces of the flange portions 26. Each of the projecting pieces 28 is provided with through holes 28a for receiving bolts 60 which will be described below. The main cover body 20 is composed of a synthetic resin, and is formed integrally with the projecting pieces 28.

The back plate 30 includes a central portion 32 which is placed on the door portion 22 of the main cover body 20, a slit 34 which is formed in the central portion 32 such that it is positioned directly behind the tear line 24, edge portions 36 which are continuous to the central portion 32, and openings 38 which are formed in the edge portions 36 and through which the projecting pieces 28 are inserted. The back plate 30 is also composed of a synthetic resin, and the central portion 32 of the back plate is formed integrally with the door portion 22 of the main cover body 20.

In order to form the central portion 32 and the door portion 22 integrally with each other, the main cover body 20 and the back plate 30 are formed by a co-injection molding process in which the main cover body 20 and the back plate 30 are successively formed by injection molding such that the central portion 32 and the door portion 22 are formed integrally with each other.

According to an alternative embodiment of the present invention, the main cover body 20 and the back plate 30 may first be formed separately, and then be combined together by a fixing method such as vibration molding.

Figure 6:
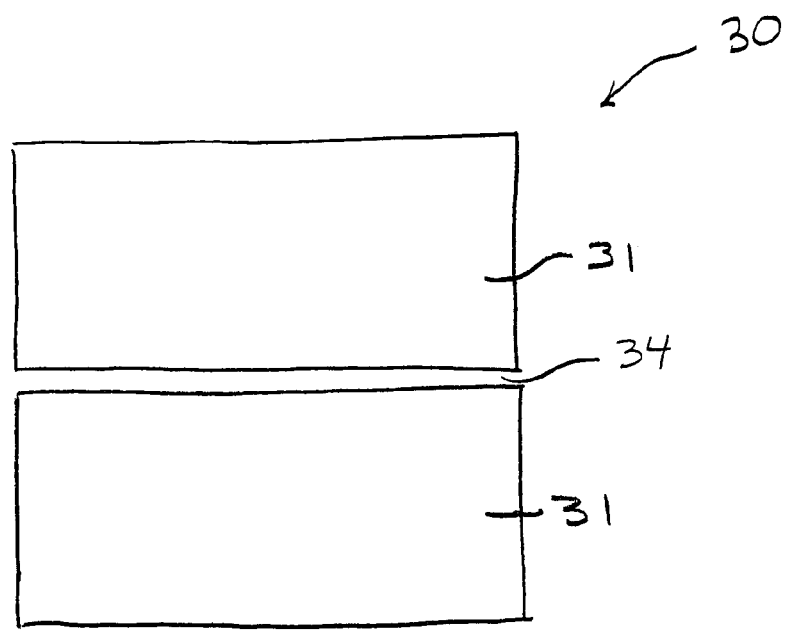
FIG. 6 is a top view of an embodiment of the back plate according to an embodiment of the present invention.
Figure 7:
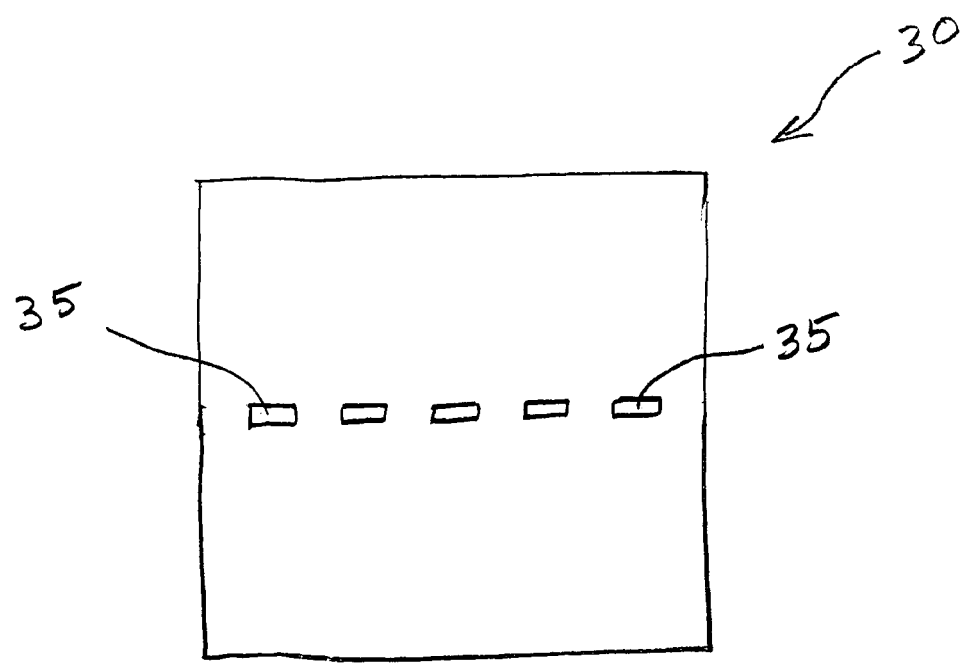
FIG. 7 is a top view of the back plate according to an alternative embodiment of the present invention.

As shown in FIG. 6, the back plate 30 may include a pair of plates 31 separated by the slit 34. Alternatively, as shown in FIG. 7, the back plate 30 may include a single plate having a series of aligned slits or openings 35.

Figure 5A:
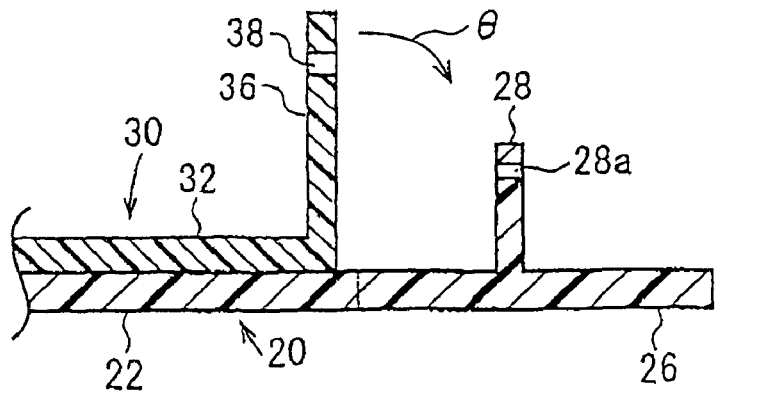
FIG. 5 is an assembly diagram of the cover.

As shown in FIG. 5(a), the back plate 30 is formed such that the edge portions 36 are approximately perpendicular to the central portion 32. The edge portions 36 can be bent with respect to the central portion 32, as shown in FIG. 5(b).

The connectors 40 are composed of a synthetic resin, and each of the connectors 40 includes a front piece 42 which is placed on one of the edge portions 36 of the back plate 30, a leg piece 44 which projects rearward from the front piece 42, an opening 46 through which one of the projecting pieces 28 is inserted, and a pair of upright pieces 48 which project from both edges of the opening 46. The upright pieces 48 are provided with through holes 48a for receiving the bolts 60, and the leg piece 44 is provided with openings 44a which engage with hook members 64 provided on the container 12.

Figure 5B:
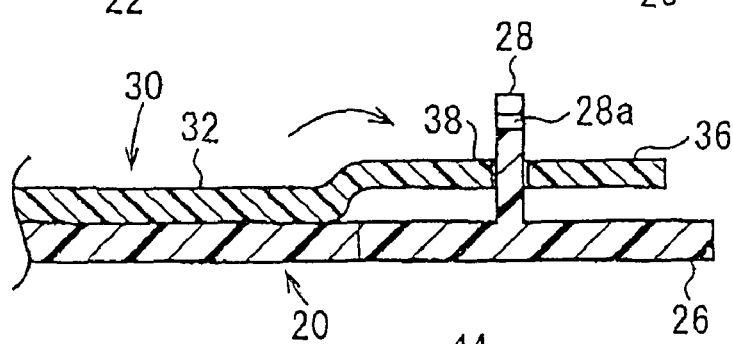
Figure 5C:
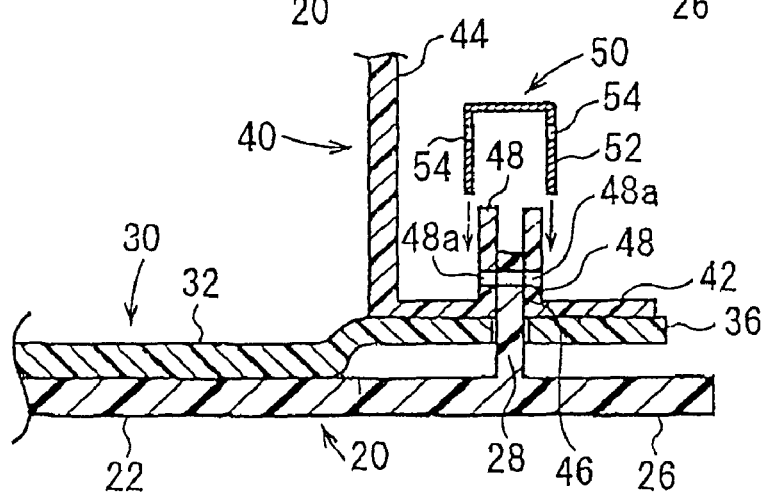
Figure 5D:
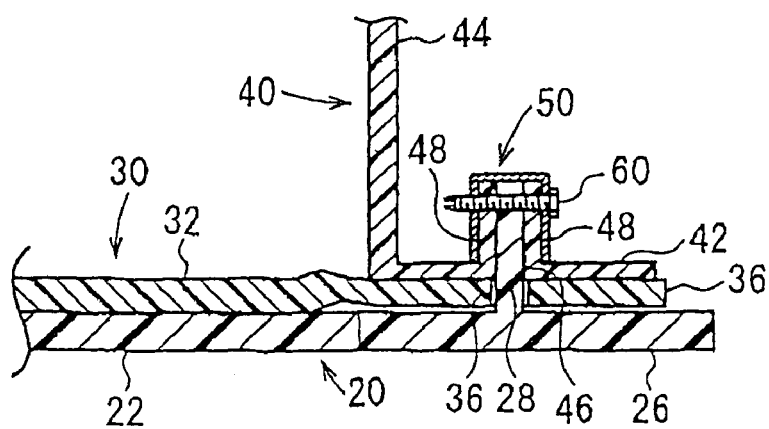

As shown in FIG. 3, when the cover 18 is assembled, each of the edge portions 36 which projects from the central portion 32 is bent in the direction shown by θ in FIGS. 3 and 5(a), and is placed on the flange portion 26 of the main cover body 20 such that the projecting piece 28 is inserted into the opening 38 (FIG. 5(b)). Then, the front piece 42 of one of the connectors 40 is placed on this edge portion 36 such that the projecting piece 28 is inserted into the opening 46 (FIGS. 4 and 5(c)).

Next, U-shaped clip fittings 50 are fitted to the pair of upright pieces 48 and 48. Each of the clip fittings 50 has a pair of parallel plates 52 and 52, and each of the parallel plates 52 and 52 is provided with a bolt hole 54. One of the bolt holes 54 and 54 has an internal thread.

The upright pieces 48 and 48 are clamped with the clip fittings 50, and the bolts 60 are screwed into the bolt holes 54 and the through holes 48a and 28a. Accordingly, the connectors 40 and the edge portions 36 of the back plate 30 are combined with the main cover body 20, and the cover 18 is completed.

The cover 18 is engaged with the container 12 from the front. By engaging the hook members 64 of the container 12 with the openings 44a formed in the leg pieces 44 of the connectors 40, the cover 18 is connected to the container 12 and the airbag apparatus 10 is completed.

In the airbag apparatus 10 which is constructed as described above, when the gas generator 16 is activated and ejects gas, the airbag 14 inflates and the door portion 22 breaks along the tear line 24. Thus, the door portion 22 opens outward as shown in FIG. 2. At this time, stress concentration occurs at regions around the boundaries between the door portion 22 and the flange portions 26, so that the main cover body 20 breaks at the regions around these boundaries and two halves of the door portion 22 are separated from the flange portions 26. Since the back plate 30 is connected to the door portion 22 and the edge portions 36 of the back plate 30 are restrained by the projecting pieces 28, the two halves door portion 22 can be prevented from being released.

According to an alternative embodiment of the present invention, the two halves of the door portion 22 may also be continuous to the flange portions 26.

When the door portion 22 starts to open, the back plate 30 is bent at regions around the boundaries between the central portion 32 and the edge portions 36, and the door portion 22 and the central portion 32 opens together. Accordingly, the airbag 14 expands into the vehicle cabin to cushion and protect the passenger.

In the cover 18 of this airbag apparatus 10, the main cover body 20, the back plate 30, and the connectors 40 may be composed of different materials, and each of them is composed of a material having characteristics suitable for the use. For example, the connectors 40 may be composed of a high-strength material, the back plate 30 may be composed of a highly flexible material, and the main cover body 20 may be composed of a material which provides attractive appearance and good tactile feel.

The main cover body 20 may be composed of, for example, polypropylene, modified polyphenylene oxide (PPO), or ABS. The back plate 30 may be composed of, for example, a thermoplastic elastomer. The connectors 40 may be constructed of a thermoplastic elastomer which has a higher strength than that used as the material of the back plate 30 or polypropylene.

According to an embodiment of the present invention, the projecting pieces 28 are engaged with the openings 38 formed in the edge portions 36 of the back plate 30. As a result, the back plate 30 is attached to the main cover body 20 and the connectors 40 with high strength. In addition, as shown in FIGS. 5(a)–5(d), the cover 18 can be extremely easily assembled.

Although a lid which is larger than the container 12 is used as the main cover body 20 in the above-described embodiment, an instrument panel may also be used as the main cover body 20. In addition, although the projecting pieces 28 and the upright pieces 48 are fixed by using the clip fittings 50 and the bolts 60, the projecting pieces 28 and the upright pieces 48 may also be fixed by attaching the clip fittings by hot-air welding or ultrasonic welding.

As described above, according to the present invention, each of the main cover body, the back plate, and the connectors may be composed of a material suitable for the use, and an advantage in that the expansion performance of the airbag increases can be obtained.

The priority application, Japanese Patent Application No. 2002-262960 filed on Sep. 9, 2002, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A cover of an airbag apparatus comprising:
   a main cover body having a door portion which opens when an airbag inflates; and
   a back plate mounted on a back surface of the main cover body; and
   connectors extending away from the main cover body for connecting the cover to an airbag container; wherein the back plate and the connectors are separate elements;
   wherein each of the connectors includes a front piece placed on the back plate and a leg piece which projects rearward from the front piece behind the main cover body and is configured to be connected to the container;
   wherein the main cover body includes projecting pieces which project rearward from the back surface of the main cover body;
   wherein the projecting pieces extend through openings formed in the front pieces of the connectors and openings formed in the back plate.

2. The cover of claim 1, wherein the back plate includes a pair of plates separated by a slit.

3. The cover of claim 1, wherein the back plate includes a series of slits positioned to form a weakened region that separates when the airbag deploys.

4. The cover of claim 1, wherein each of the front pieces of the connectors includes a pair of upright pieces which project from the edges of the opening formed in the front piece.

5. The cover of claim 4, wherein the upright pieces of each of the front pieces are connected to one of the projecting pieces.

6. The cover of claim 1, wherein a central portion of the back plate is fixed to a door portion of the main cover body and edge portions of the back plate are formed continuously to the central portion such that the edge portions can be bent.

7. The cover of claim 6, wherein the edge portions are provided with openings and are positioned on the back surface of the main cover body so that projecting pieces of the main cover body extend through the openings.

8. The cover of claim 1, wherein the main cover body is a lid or an instrument panel.

9. An airbag apparatus comprising a container which is open at the front side, an airbag stored in the container, a gas generator for inflating the airbag, and a cover which covers the front side of the container, wherein the cover includes a main cover body having a door portion which opens when an airbag inflates; and a back plate mounted on a back surface of the main cover body; and connectors extending away from the main cover body for connecting the cover to an airbag container; wherein the back plate and the connectors are separate elements; wherein each of the connectors includes a front piece placed on the back plate and a leg piece which projects rearward from the front piece behind the main cover body and is configured to be connected to the container; wherein the main cover body includes projecting pieces which project rearward from the back surface of the main cover body; wherein the projecting pieces extend through openings formed in the front pieces of the connectors and openings formed in the back plate.

* * * * *